United States Patent
Yau et al.

(10) Patent No.: US 10,834,571 B1
(45) Date of Patent: Nov. 10, 2020

(54) STEERING OF ROAMING FOR 5G CORE ROAMING IN AN INTERNET PACKET EXCHANGE NETWORK

(71) Applicant: Syniverse Technologies, LLC, Tampa, FL (US)

(72) Inventors: Edward Yau, Tseung Kwan O (HK); Kin Cheung, Tuen Mun (HK); Jerry Handra, Singapore (SG); Chi Lap Seto, Sai Wan Ho (HK); Jacky Luk, Kowloon (HK); Kenneth Mak, North Point (HK)

(73) Assignee: Syniverse Technologies, LLC, Tampa, FL (US)

(*) Notice: Subject to any disclaimer, the term of this patent is extended or adjusted under 35 U.S.C. 154(b) by 0 days.

(21) Appl. No.: 16/942,164

(22) Filed: Jul. 29, 2020

Related U.S. Application Data

(60) Provisional application No. 62/882,312, filed on Aug. 2, 2019.

(51) Int. Cl.
*H04W 8/12* (2009.01)
*H04W 12/06* (2009.01)
(Continued)

(52) U.S. Cl.
CPC ....... *H04W 8/12* (2013.01); *H04W 12/04031* (2019.01); *H04W 12/06* (2013.01);
(Continued)

(58) Field of Classification Search
None
See application file for complete search history.

(56) References Cited

U.S. PATENT DOCUMENTS

| 2017/0005914 | A1* | 1/2017 | Edge | H04L 61/1511 |
| 2019/0253395 | A1* | 8/2019 | Bykampadi | H04W 12/00505 |
| 2020/0036754 | A1* | 1/2020 | Livanos | H04W 8/12 |

OTHER PUBLICATIONS

3GPP TS 23.501 version 15.2.0 Release 15, 3rd Generation Partnership Project; Technical Specification Group Services and System Aspects; System Architecture for the 5G System; Stage 2, 2018.
(Continued)

*Primary Examiner* — Faruk Hamza
*Assistant Examiner* — Cassandra L Decker
(74) *Attorney, Agent, or Firm* — Andriy Lytvyn; Smith & Hopen, P.A.

(57) ABSTRACT

A system and method for implementing Steering of Roaming for 5G core roaming in an Internet Packet Exchange (IPX) network. A Hypertext Transfer Protocol (HTTP)/2 Proxy is deployed in an IPX network. The HTTP/2 Proxy receives N32-f request message from a Visited Public Land Mobile Network (VPLMN). The N32-f request has an embedded N12 authorization request message or an embedded N8 registration request message. If VPLMN is a non-preferred roaming partner, the HTTP/2 Proxy appends a patch-request to N32-f request message and routes it to the Home Public Land Mobile Network (HPLMN). The patch-request causes the home Security Edge Protection Proxy (hSEPP) to replace Mobile Country Code (MCC) or Mobile Network Code (MNC) value with a predefined value that will trigger a rejection from HPLMN. The mobile device will select another VPLMN. If the VPLMN is a preferred roaming partner, the HTTP/2 Proxy routes the request without appending a patch-request.

20 Claims, 11 Drawing Sheets

(51) Int. Cl.
*H04W 76/11* (2018.01)
*H04W 60/00* (2009.01)
*H04W 12/04* (2009.01)
*H04W 84/04* (2009.01)

(52) U.S. Cl.
CPC ............ *H04W 60/00* (2013.01); *H04W 76/11* (2018.02); *H04W 84/042* (2013.01)

(56) References Cited

OTHER PUBLICATIONS

3GPP TS 23.502 version 15.2.0 Release 15, 3rd Generation Partnership Project; Technical Specification Group Services and System Aspects; Procedures for the 5G System; Stage 2, 2018.
3GPP TS 29.573 version 15.1.0 Release 15, 3rd Generation Partnership Project; Technical Specification Group Core Network and Terminals; 5G System; Public Land Mobile Network (PLMN) Interconnection; Stage 3, 2019.
3GPP TS 33.501 version 15.4.0 Release 15, 3rd Generation Partnership Project; Technical Specification Group Services and System Aspects; Security architecture and procedures for 5G system, 2019.

\* cited by examiner

STEERING OF ROAMING FOR 5G CORE ROAMING IN AN INTERNET PACKET EXCHANGE NETWORK

PRIORITY CLAIM

This non-provisional application claims priority to a U.S. Provisional Application having Ser. No. 62/882,312 filed on Aug. 2, 2019.

BACKGROUND OF THE INVENTION

1. Field of the Invention

This invention relates generally to the field of Internet Protocol (IP) and telecommunications networks, specifically to the 5G Core Roaming in Internetwork Packet Exchange (IPX). More specifically, it relates to methods and systems for implement Steering of Roaming (SoR) for outbound roamers of mobile operators for 5G core roaming in IPX networks, using message mediation on the N32 interface between Security Edge Protection Proxy (SEPP) of a Home Public Land Mobile Network (HPLMN) and SEPP of a Visited Public Land Mobile Network (VPLMN).

2. Brief Description of the Related Art

Mobile roaming refers to a scenario in which a mobile subscriber of a Home Public Land Mobile Network (HPLMN) operator is using mobile service provided by a Visited Public Land Mobile Network (VPLMN) in a foreign location.

Steering of roaming (SoR) refers to a procedure commonly used by the HPLMN to direct outbound roamers to attach onto a preferred VPLMN. Some of the reasons for implementing SoR include the following: 1) HPLMN may benefit from a difference in Inter-operator Tariff (IoT) rates among various VPLMNs, and 2) HPLMN may give preference to certain VPLMNs based on the established alliances and partnerships.

SoR is usually implemented using a SIM-based approach, a network-based approach, or a combination thereof. A SIM-based approach is implemented by configuring a 'preferred PLMN' list in the SIM profile, such that a User Equipment (UE) will search for available VPLMNs in the order of the preferred list. Such configuration can be established during the SIM-card personalization phase or through Over-The-Air (OTA) provisioning.

SIM-based SoR is not as flexible as network-based SoR implementation because the algorithm to select operators among the preferred list must be pre-programmed in the UE and operator does not have control over those algorithms. SIM-based SoR methods also commonly have compatibility problems with different handsets.

Network-based SoR is usually the preferred solution for HPLMNs. Network-based SoR is usually implemented either as a separate network function or is embedded in the subscriber profile network function (such as the Home Location Register (HLR) in 2G/3G, Home Subscriber Server (HSS) in 4G, or Unified Data Management (UDM) in 5G).

Network-based SoR methods work in the following manner: a roaming UE is steered to attach onto a preferred VPLMN by rejecting network attachment requests from non-preferred VPLMNs. When a network attachment is rejected, UE usually selects another VPLMN, which, hopefully, is the preferred network. However, SoR methods usually do not simply reject all network attachment requests from the non-preferred VPLMNs because it is possible that the preferred VPLMNs has no coverage in the area in which the UE is currently located. Thus, SoR systems usually have heuristic algorithm to decide if a network attachment attempt from a non-preferred VPLMN should be rejected based on the history of attachment attempts of the UE.

SoR systems can be deployed as a network function that intercepts, proxies, or redirects roaming signaling traffic, prior to reaching the home subscriber profile function. SoR system can be deployed either at the HPLMN's core network, or at the IPX. In 2G, 3G and 4G roaming, SoR can be deployed in IPX as a standalone network function to reject network attachment requests from non-preferred VPLMNs. However, with the new 5G security design, this approach will no longer be possible due to the security design in protecting signaling messages between HPLMN and VPLMNs.

5G system architecture is specified in 3GPP TS23.501 "3rd Generation Partnership Project; Technical Specification Group Services and System Aspects; System Architecture for the 5G System; Stage 2" and TS23.502 "3rd Generation Partnership Project; Technical Specification Group Services and System Aspects; Procedures for the 5G System; Stage 2." 5G Signaling messages between roaming operators are specified in 3GPP TS29.573 "3rd Generation Partnership Project; Technical Specification Group Core Network and Terminals; 5G System; Public Land Mobile Network (PLMN) Interconnection; Stage 3." 5G security design is specified in 3GPP TS33.501 "3rd Generation Partnership Project; Technical Specification Group Services and System Aspects; Security architecture and procedures for 5G system." The above publications are incorporated herein by reference.

In 5G core roaming, as specified in 3GPP TS29.573, all signaling messages between network functions in the VPLMN and the HPLMN are carried over N32 interface between the SEPP in the VPLMN and the SEPP in the HPLMN. The SEPPs act as 'application-firewall' to provide the necessary security for communicating with roaming partners, such as topology hiding, message authenticity, integrity and confidentiality checking, encryption of information elements, etc.

In 3GPP TS29.573 and TS33.501, there are two possible inter-PLMN security options between the SEPP and the VPLMN and the SEPP in the HPLMN. When there is no IPX between the VPLMN and the HPLMN, inter-PLMN security shall use Transport Layer Security (TLS), where and end-to-end TLS connection is established for the N32 interface between the SEPP in the VPLMN and the SEPP in the HPMN. When there is one or more IPX between the VPLMN, and the HPLMN, inter-PLMN security shall use the PRotocol for N32 INterconnect Security (PRINS) model, where Application Layer Security (ALS) is used between the SEPP in the VPLMN and the SEPP in the HPLMN. This invention relates to the use of the PRINS model.

In the PRINS model of 5G core roaming, all request and response messages in the N32 interface are protected with integrity and authenticity check. Each N32 message needs to be digitally signed by the sender SEPP. Thus, if the SoR, deployed in an IPX network, rejects a message from a non-preferred VPLMN, the rejected message will not be signed by the private key of the HPLMN's SEPP. Therefore, traditional IPX-based SoR methods cannot be implement in 5G core roaming.

Routing a N32 message to another network function or application platform is also not possible since each N32-f message is associated with a 'N32-f context-id' with a session key for JSON Web Encryption (JWE) encryption. Thus, it is not possible for IPX providers to route a N32 network attachment signaling message to a separate SoR platform before reaching the HPLMN.

Thus, what is needed is a new method and system for implementing (SoR) in IPX network for 5G core roaming, while complying to the 5G security requirements.

SUMMARY OF THE INVENTION

An HTTP/2 Proxy is provided in an IPX network. The HTTP/2 Proxy implements the SoR business logic to determine whether a VPLMN attachment shall be rejected. Such business logic usually depends on the PLMN-ID, which comprises of Mobile Country Code (MCC) and Mobile Network Code (MNC). In addition, the determination as to whether a network attachment request should be accepted or rejected may depend on the timing and the number of retries of network attachment attempts.

Specifically, an embodiment of the invention pertains to a method for network-based Steering of Roaming (SoR) of a User Equipment (UE) subscribed to a Home Public Land Mobile Network (HPLMN) and roaming in a location where a plurality of Visited Public Land Mobile Networks (VPLMNs) have 5G network coverage, wherein the HPLMN is interconnected with the plurality of VPLMNs via an Internet Packet Exchange (IPX) network. A Proxy server (HTTP/2 Proxy) is provided in the IPX network. The HTTP/2 Proxy is configured to receive authentication and registration messages sent between visiting Security Edge Protection Proxy (vSEPP) and home Security Edge Protection Proxy (hSEPP) over N32-f interface (herein referred to as "N32-f messages" or "request messages").

Network attachment procedure in 5G core roaming scenario involves the following two processes: authentication and registration. The SoR method according to the present invention can be implemented at the authentication stage and/or the registration stage. When a UE selects a first VPLMN having mobile network coverage in the current location of the UE, the first VPLMN sends a N32-f message to the HPLMN. At the authentication stage, the N32-f message has an embedded N12 authentication request message, while at the registration stage, the N32-f message has an embedded N8 registration request message. The IPX-based SoR method disclosed herein can be applies in both cases. The N12 authentication request message or the N8 registration request message can be embedded into the N32-f message as a JavaScript Object Notation (JSON) object.

Upon receipt of the N32-f message, the Proxy server extracts a Public Land Mobile Network Identifier (PLMN ID) of the VPLMN from the N32-f message. The Proxy server queries, a preferred roaming partner database for the PLMN ID to determine whether the PLMN ID is present in the preferred roaming partner database. If the PLMN ID is absent from the preferred roaming partner database, the Proxy server determines that the VPLMN is a non-preferred roaming partner of the HPLMN, and, therefore, the request message from VPLMN should be rejected. To achieve this objective, the Proxy server appends a patch-request to the N32-f message configured to cause the hSEPP of the HPLMN to replace a Mobility Country Code (MCC) value or a Mobility Network Code (MNC) value in the embedded N12 authentication request message or the embedded N8 registration request message with a predefined value, wherein the predefined value is configured to cause the HPLMN to respond with a rejection message. The Proxy server digitally signs the patch-request and routes the N32-f message and the patch-request to the hSEPP.

Upon validation of the patch-request, the hSEPP is configured to replace the MCC or the MNC value in the embedded N12 authentication request message or the embedded N8 registration request message with the predefined value specified in the patch-request, thereby causing the HPLMN to respond with a rejection message. The Proxy server receives the rejection message from the HPLMN and routes the rejection message to the VPLMN. The rejection message causes the VPLMN to abort the network attachment procedure.

Next, the UE selects another VPLMN having network coverage in the UE's current location. This second VPLMN sends N32-f message to the HPLMN via the IPX network. The Proxy server receives that N32-f message and extracts the PLMN ID of the second VPLMN. The Proxy server queries the preferred roaming partner database for the PLMN ID to determine whether the PLMN ID of the second VPLMN is present in the preferred roaming partner database. If the PLMN ID is present in the preferred roaming partner database, the Proxy server routes the second N32-f message to the HPLMN, without appending a patch-request. HPLMN responds with a positive response message. The Proxy server receives the positive response message from the HPLMN and routes it to the second VPLMN, thereby causing the second VPLMN. The second VPLMN, which is a preferred roaming partner of the HPLMN, proceeds with the network attachment.

In the IPX-based SoR method described above, the hSEPP is configured to validate the patch-request using the public key of the Proxy server. Upon validation, hSEPP extracts the embedded N12 authentication request message or the embedded N8 registration request message from the N32-f message and replaces the MCC/MNC value with the value specified in the patch request. In the N12 implementation of the SoR method, the hSEPP is configured to route an extracted N12 authentication request message to an Authentication Server Function (AUSF) of the HPLMN. In the N8 registration implementation of the SoR method, the hSEPP is configured to route the extracted N8 registration request message to a Unified Data Management (UDM) of the HPLMN.

In an embodiment, the Proxy server mediates the 'servingNetworkName' in 'AuthenticationInfo' information element of N12 Nausf_UEAuthentication 'Authenticate' request message from Access and Mobility Management Function (AMF) to Authentication Server Function (AUSF). The servingNetworkName is a string that includes the MCC and MNC values, such as "5G: mnc002.mcc001.3gppnetwork.org' where '002' is the MNC code and '001' is the MCC code. The modified MCC/MNC is not in home operator's roaming partner list so the AUSF will reject the request as usual.

In an embodiment, the Proxy server mediates the 'plmnId' (Public Land Mobile Network Identifier) in 'guami' (Globally Unique AMF Identifier) in 'Amf3GppAccessRegistration' information element of N8 Nudm_UEContextManagement 'Registration' request message from Access and Mobility Management Function (AMF) to Unified Data Management (UDM). 'plmnId' is a JavaScript Object Notation (JSON object) that comprises of MCC and MNC codes (in string format), such as {"mcc":

"001", "mnc":"002"}. The modified MCC/MNC is not in home operator's roaming partner list so the UDM will reject the request as usual.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE PREFERRED EMBODIMENT

Figure 1:
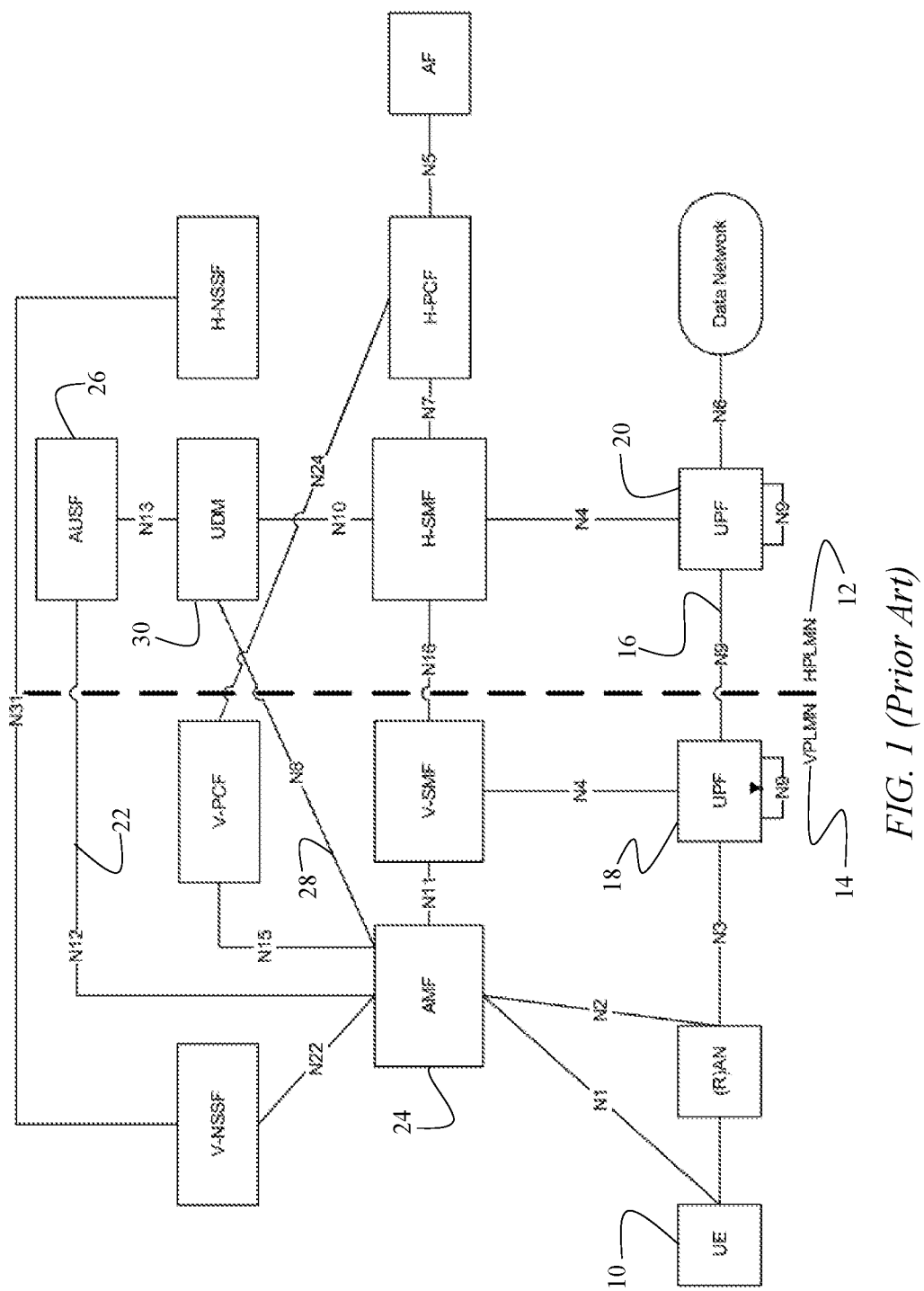
FIG. 1 is a block diagram schematically depicting the 5G roaming architecture in a home-routed scenario in reference point representation. Reference point for network interface between network functions are shown.
Figure 2:
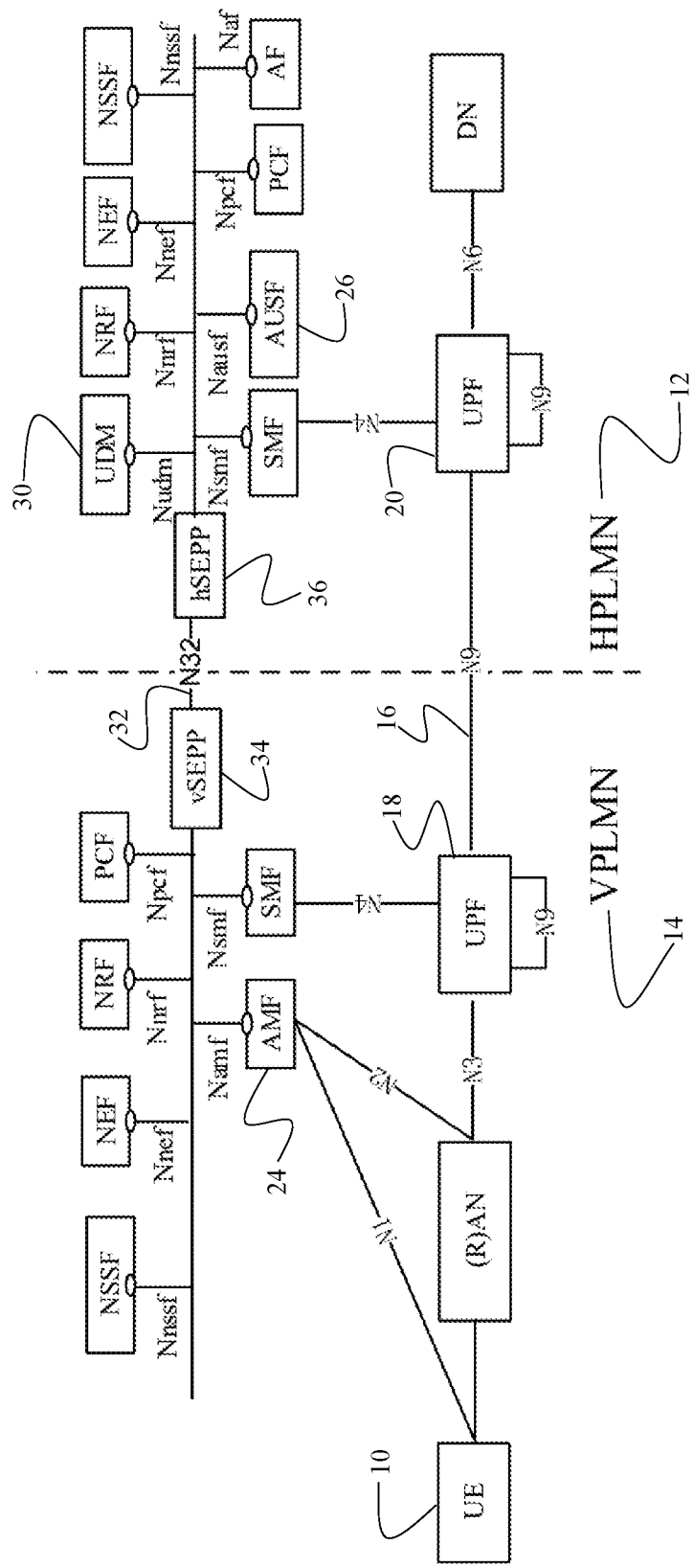
FIG. 2 is a block diagram schematically depicting the 5G roaming architecture in a home-routed scenario in service-based representation. Supported service names at network functions are shown.

In telecommunication networks, there are two roaming scenarios: home-routed and local breakout (LBO). FIGS. 1-2 pertain to home-routed roaming scenario, while FIGS. 3-4 pertain to LBO scenario. FIG. 1 schematically depicts architecture of the fifth generation (5G) technology standard for cellular networks roaming for home-routed traffic. FIG. 1 depicts a User Equipment (UE) 10, which can be a smartphone, a computer, a connected vehicle, an internet of things (IoT) device, or any other device configured to communicate via a telecommunications network. UE 10 is a subscriber of a Home Public Land Mobile Network (HPLMN) 12. UE 10 is located in a geographic area in which Visited Public Land Mobile Network (VPLMN) 14 has 5G network coverage. FIG. 1 depicts that in home-routed traffic scenario, device payload traffic accessing the internet is traversed back to HPLMN 12 via the N9 interface 16 between the User Plane Function (UPF) 18 in VPLMN 12 and UPF 20 in HPLMN 12.

To enable UE 10 to roam with VPLMN 14, UE 10 must complete a network attachment procedure. According to 5G specification, the network attachment procedure involves the following processes: (1) authentication over N12 interface 22 between Access and Mobility Management Function (AMF) 24 of VPLMN 14 and Authentication Server Function (AUSF) 26 of HPLMN 12; and (2) registration over N8 interface 28 between AMF 24 of VPLMN 14 and Unified Data Management (UDM) 30 of HPLMN 12. The authentication process involves Nausf service, wherein AMF 24 sends an authenticate request message (Nausf_UEAuthenticate) to AUSF 26 over N12 interface 22. The registration process involves Nudm service, wherein AMF 24 sends a registration request message (Nudm_UEContextManagement) over N8 interface 28 to UDM 30.

FIG. 2 schematically depicts both the Nausf service produced by AUSF 26 and the Nudm service produced by UDM 30. FIG. 2 depicts that AMF 24 consumes the Nausf and Nudm services via the N32 interface 32 between a visiting Security Edge Protection Proxy (vSEPP) 34 of VPLMN 14 and a home Security Edge Protection Proxy (hSEPP) 36 of HPLMN 12.

SEPP is a non-transparent proxy that provides the following functionality: 1) protects application layer control plane messages between two Network Functions (NFs) in different PLMNs, 2) performs mutual authentication and negotiation of cipher suites with a remote SEPP, 3) handles management and setup of cryptographic keys for securing messages on N32-f interface, and 4) provides topology-hiding by limiting the internal topology information visible to external parties.

Figure 3:
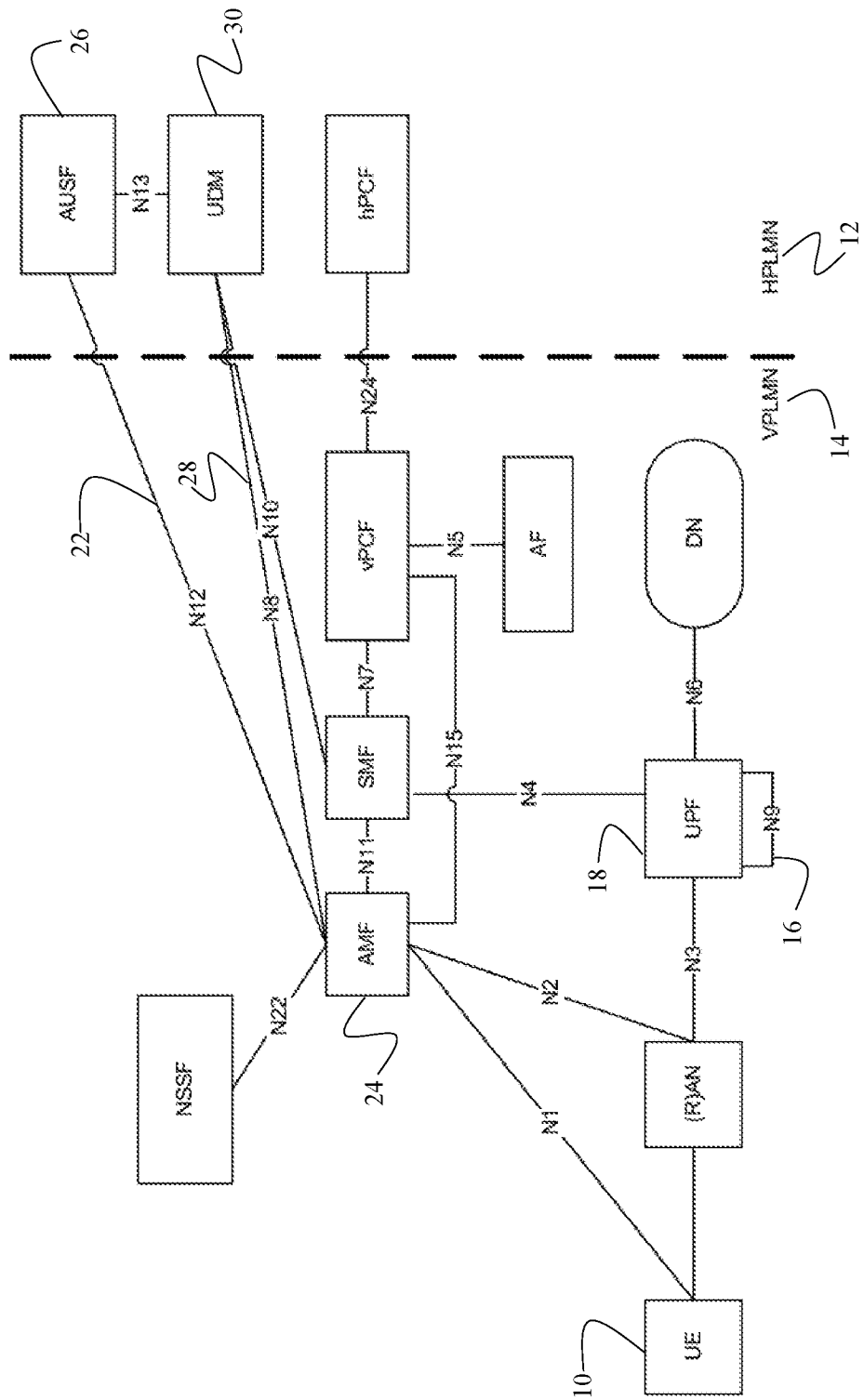
FIG. 3 is a block diagram schematically depicting the 5G roaming architecture in a local-breakout scenario in reference point representation. Reference point for network interface between network functions are shown.

FIG. 3 schematically depicts 5G roaming architecture for LBO traffic. In LBO roaming scheme, device payload traffic accesses the Internet directly at VPLMN 14, via local UPF 18. Analogously to the home-routed scenario discussed above, to roam with VPLMN 14, UE 10 must perform a network attachment procedure involving the authentication and registration processes. The authentication process involves Nausf service, wherein AMF 24 sends an authenticate request message (Nausf_UEAuthenticate) to AUSF 26 over N12 interface 22. The registration process involves Nudm service, wherein AMF 24 sends a registration request message (Nudm_UEContextManagement) over N8 interface 28 to UDM 30.

Figure 4:
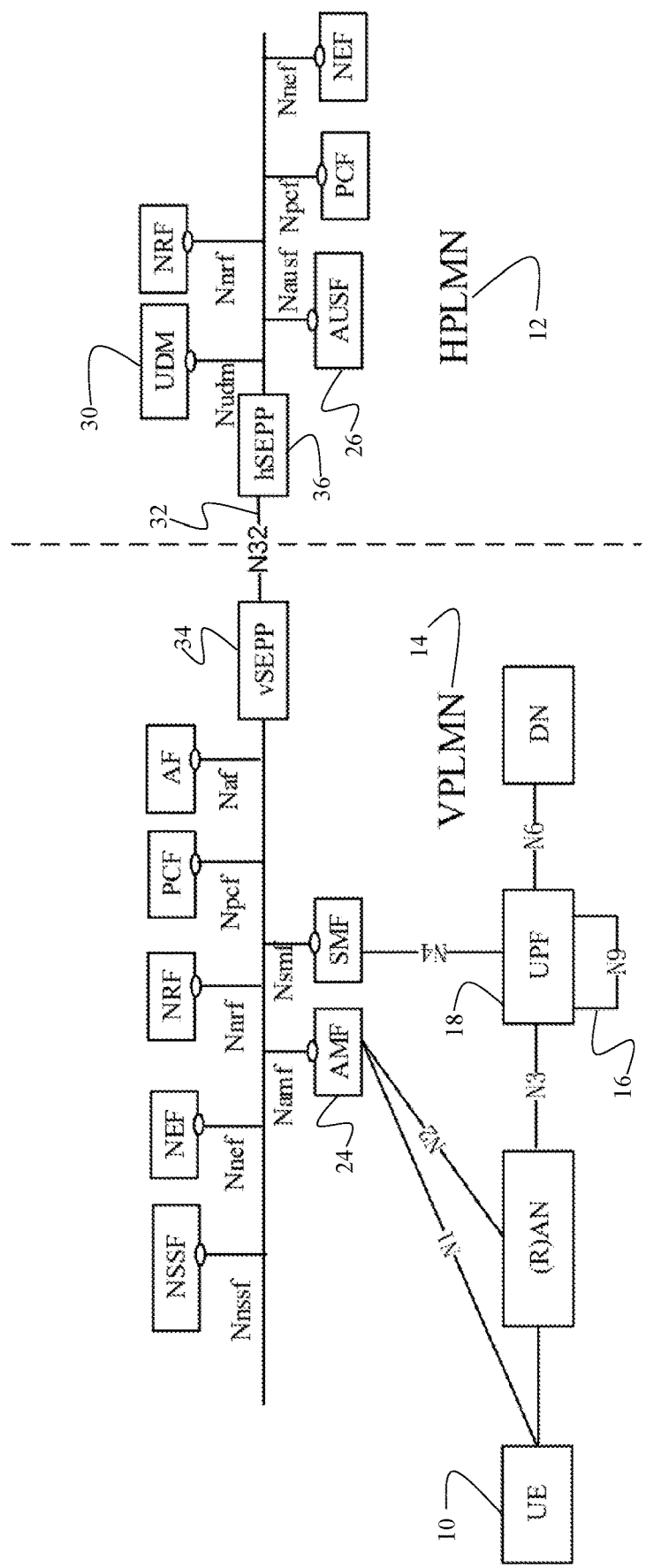
FIG. 4 is a block diagram schematically depicting the 5G roaming architecture in a local-breakout scenario in service-based representation. Supported service names at network functions are shown.

FIG. 4 schematically depicts both the Nausf service produced by AUSF 26 and the Nudm service produced by UDM 30. Analogously to the home-routed scenario, FIG. 4 depicts that in the LBO scenario, AMF 24 consumes both the Nausf and Nudm services via the N32 interface 32 between vSEPP 34 and hSEPP 36.

Figure 5:
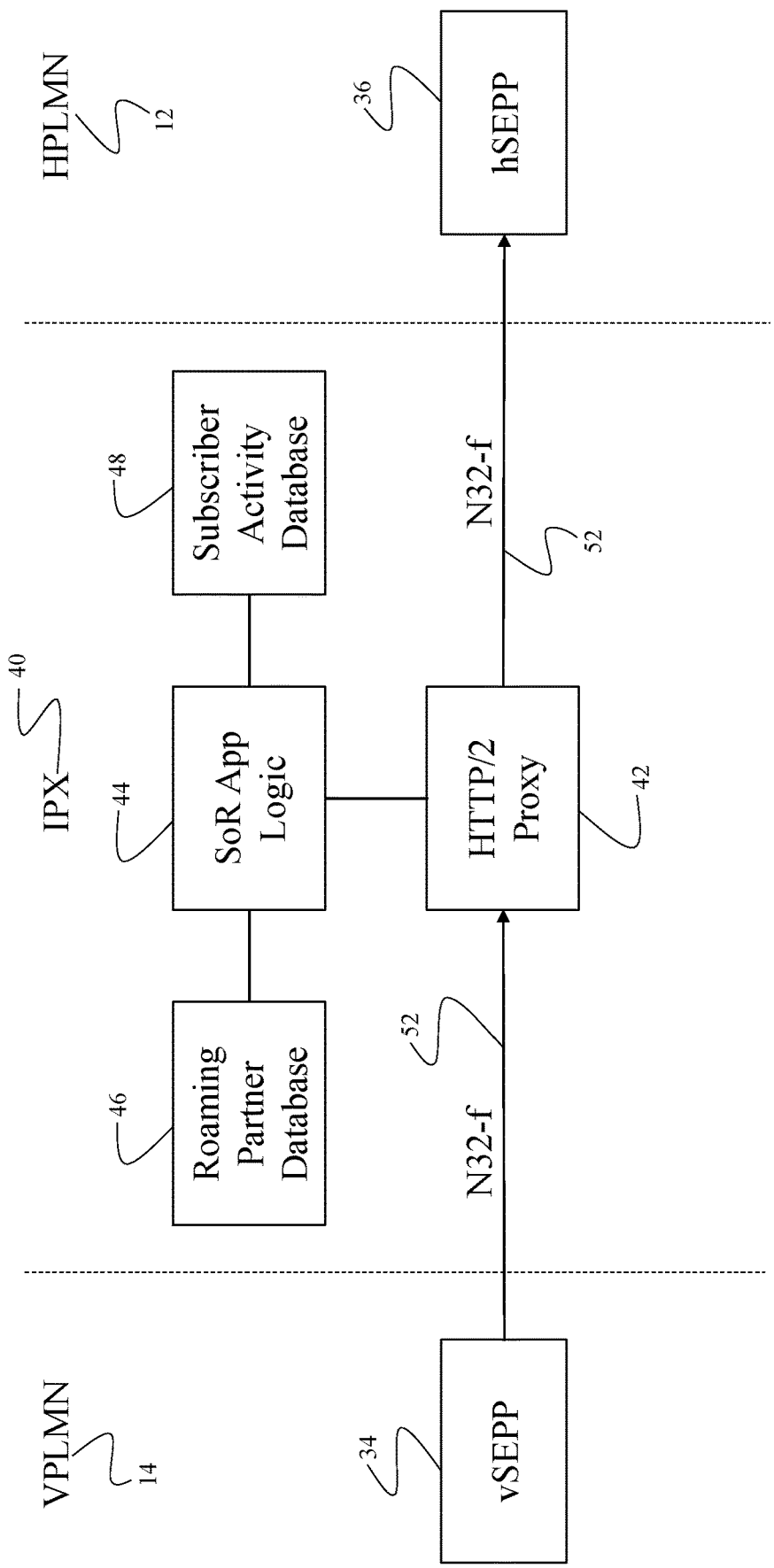
FIG. 5 is a block diagram schematically depicting the system architecture of a Steering of Roaming platform which comprises of 1) a HTTP/2 Proxy, 2) SoR Application Logic Module, 3) Subscriber Activity Database, 4) Roaming Partner Database

In the embodiment depicted in FIG. 5, the invention pertains to a scenario in which HPLMN 12 and VPLMN 14 are interconnected via an Internetwork Packet Exchange (IPX) network 40. In this embodiment, authentication and registration messages between vSEPP 34 and hSEPP 36 traverse IPX network 40. FIG. 5 further depicts a Hypertext Transfer Protocol (HTTP)/2 Proxy 42 deployed in IPX network 40. HTTP/2 Proxy 42 is configured to proxy and mediate messages exchanged between the VPLMN 14 and the HPLMN 12 via N-32f interface 52.

FIG. 5 further depicts that HTTP/2 Proxy 42 utilizes a Steering of Roaming (SoR) Application Logic Module 44. SoR Application Logic Module 44 determines whether a network attachment request from VPLMN 14 shall be accepted or rejected. In an embodiment, HTTP/2 Proxy 42 intercepts N32-f messages between vSEPP 34 and hSEPP 36. HTTP/2 Proxy 42 extracts Public Land Mobile Network Identity (PLMN-ID) of VPLMN 14, wherein PLMN-ID comprises Mobile Country Code (MCC) and Mobile Network Code (MNC) of VPLMN 14. Next, SoR Application Logic Module 44 queries a Roaming Partner Database 46 to determine whether the extracted PLMN-ID belongs to a preferred or a non-preferred roaming partner of HPLMN 12. Roaming Partner Database 46 stores PLMN-IDs of the whitelisted roaming partners and preferred roaming partners in each country. An objective of the SoR method is to reject network attach requests from non-preferred or non-whitelisted VPLMNs 14 and only accept network attach attempts from those VPLMNs 14 whose PLMN-IDs are included in Roaming Partner Database 46.

In an embodiment, SoR Application Logic Module 44 may be configured to communicate with Subscriber Activity Database 48. Subscriber Activity Database 48 stores roaming activities of subscribers, which SoR Application Logic Module 44 can reference to facilitate SoR determination. For example, if the number of consecutive network attachment requests from the same UE 10 from the same country exceeds a certain predefined threshold, the attachment will be accepted even if it originated from a non-preferred VPLMN 14. In this example, SoR Application Logic Module 44 will determine that failure of UE 10 to successfully attach to a preferred VPLMN 14 may imply that no preferred VPLMNs 14 has coverage in the current location of UE 10. In these circumstances, SoR Application Logic Module 44 may allow UE 10 to roam with a non-preferred VPLMN 14.

An exemplary implementation of the SoR method according to an embodiment of the invention is explained with reference to FIGS. 6A and 6B. In the embodiment depicted in FIGS. 6A and 6B, vSEPP 34 and hSEPP 36 communicate with one another via the N32 interface 32. The N32 interface comprises N32-c (control) plane 50 and N32-f (forward) plane 52, each discussed in more detail below.

N32-c interface 50 provides the following functionalities: 1) security capability negotiation procedure, 2) parameter exchange procedure, 3) N32-f context termination procedure, and 4) N32-f error reporting procedure. N32-c interface 50 is exchanged directly between the vSEPP 34 and hSEPP 36. N32-c interface 50 is secured end-to-end via Transport Layer Security (TLS).

In contrast to N32-c interface 50, N32-f interface 52 may traverse HTTP/2 Proxy 42 in IPX network 40. N32-f interface is protected by Application-Layer Security (ALS) in the PRotocol for N32 INterconnect Security (PRINS) model. HTTP/2 Proxy 42 in IPX network 40 may perform message mediation in both request and response messages, subject to the allowed policies between vSEPP 34 and hSEPP 36. N32-f interface 52 is used to forward the Javascript Object Signing and Encryption (JOSE) protected HTTP/2 messages between NFs in different PLMNs. N32-f interface 52 can either be implemented in TLS, which provides end-to-end security between the vSEPP 34 and hSEPP 36, or in the ALS, which allows providers of IPX networks 40 to mediate contents of N32-f messages. This latter option enables the present invention to implement the SoR method, as discussed in more detail below.

Figure 6A:
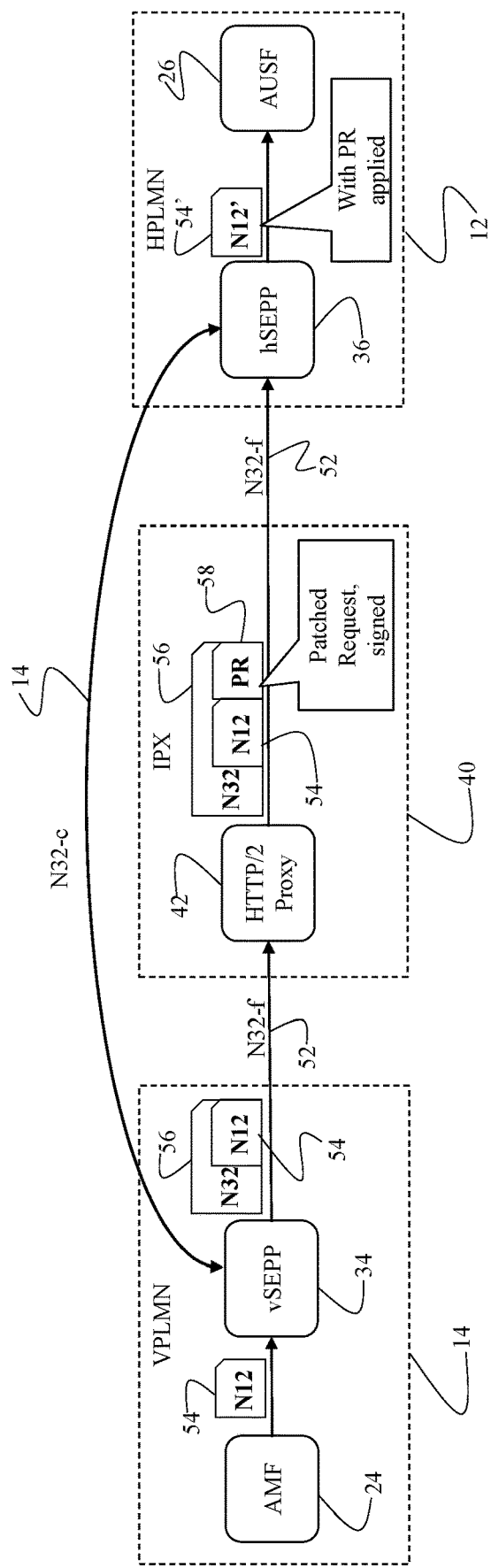
FIG. 6A is a block diagram schematically depicting the architecture showing a HTTP/2 Proxy in IPX performing message mediation on a N32-f request from VPLMN to HPLMN, wherein the N32-f request has an embedded N12 authentication request message sent from AMF to AUSF.

FIG. 6A pertains to the authentication procedure of the network attachment process. To provide roaming service to UE 10, VPLMN 14 must first authenticate UE 10 with AUSF 26 of HPLMN 12. The authentication procedure presents an opportunity for HTTP/2 Proxy 42 to implement its SoR logic and mediate N12 authentication request message 54 in a manner that causes HPLMN 12 to reject authentication requests from non-preferred roaming partners.

FIG. 6A depicts a N12 authentication request message 54 being sent from AMF 24 to vSEPP 34. Upon receipt of N12 authentication request message 54, vSEPP 34 reformats and embeds N12 authentication request message 54 into body of a N32-f authentication request message 56 as a JSON object. Because the 5G specification requires that N32-f messages 56 must be end-to-end integrity-protected between the vSEPP 34 and hSEPP 36, vSEPP 34 digitally-signs N32 authentication request message 56 with its private key. This digital signature enables hSEPP 36 to validate the integrity and authenticity of N32 authentication request message 56 by decrypting the digital signature with a public key of vSEPP 34.

FIG. 6A further depicts that HTTP/2 Proxy 42 deployed in IPX network 40 is configured to receive N32 authentication request message 56 from vSEPP 34. As described above, HTTP/2 Proxy 42 is configured to extract PLMN-ID of VPLMN 14 from the N32 authentication request message 56. HTTP/2 Proxy 42 is further configured to query Roaming Partner Database 46 to determine whether the extracted PLMN-ID belongs to a preferred roaming partner of HPLMN 12. If HTTP/2 Proxy 42 determines that N32 authentication request message 56 originated from VPLMN 14 that is a preferred roaming partner, HTTP/2 Proxy 42 simply forwards N32 authentication request message 56 to hSEPP 36. However, if HTTP/2 Proxy 42 determines that N32 authentication request message 56 originated from a non-preferred roaming partner, HTTP/2 Proxy 42 mediates N32 authentication request message 56 as described in the paragraph below.

If HTTP/2 Proxy 42 determines that VPLMN 14 is a non-preferred roaming partner of HPLMN 12, HTTP/2 Proxy 42 mediates N32 authentication request message 56 by appending a Patch-Request (modifications-block) 58 thereto. Patch-Request 58 can include the details about the requested modification operation—i.e., 'replace' MNC/MCC field in N32 authentication request message 56 with a predefined value. HTTP/2 Proxy 42 digitally signs Patch-Request 58 with its private key and routes N32 authentication request message 56 along with the appended Patch-Request 58 to hSEPP 36.

Upon receipt, hSEPP 36 validates the authenticity of N32 authentication request message 56 by decrypting its digital signature with the public key of vSEPP 34 and, also, validates the authenticity of Patch-Request 58 by decrypting its digital signature with the public key of HTTP/2 Proxy 42. Upon successful validation, hSEPP 36 extracts the original N12 authentication request message 54 from N32 authentication request message 56. Next, hSEPP 36 applies the change specified in Patch-Request 58 to the original N12 authentication request message 54 and sends the modified N12 authentication request message 54' to the target NF, which, in this case, is AUSF 26.

As will be explained in more detail below with reference to FIG. 7, Patch-Request 58 instructs hSEPP 36 to replace the value of MNC and/or MCC with a predefined value configured to trigger a rejection at AUSF 26. In this manner, HTTP/2 Proxy causes HPLMN 12 to reject authentication requests originating from non-preferred roaming partners.

Figure 6B:
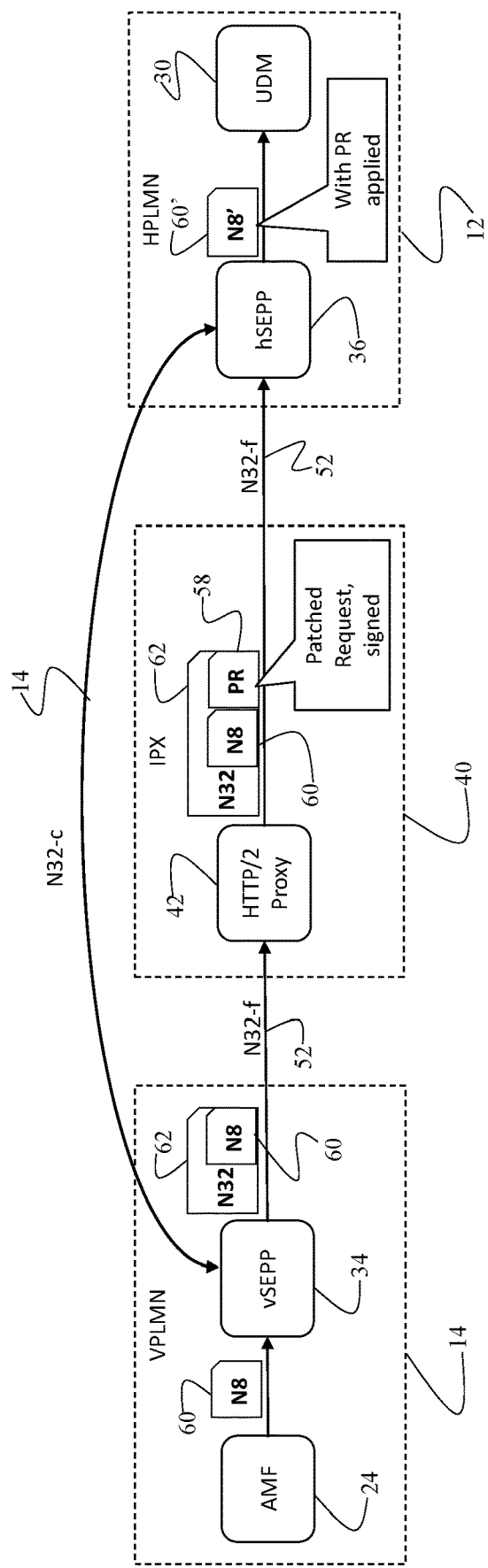
FIG. 6B is a block diagram schematically depicting the architecture showing a HTTP/2 Proxy in IPX performing message mediation on a N32-f request from VPLMN to HPLMN, wherein the N32-f request has an embedded N8 registration request message sent from AMF to UDM.

FIG. 6B pertains to the registration procedure in the network attachment process. The registration procedure involves device registration: upon successful completion of the authentication process, AMF 24 must register UE 10 with UDM 30. The registration procedure presents another opportunity for HTTP/2 Proxy 42 to implement the SoR method to reject a registration request from VPLMN 14 that is a non-preferred roaming partner.

FIG. 6B depicts an analogous method to the one described with respect to FIG. 6A, with one exception: the embodiment depicted in FIG. 6A utilizes N12 authentication request message 54 to illicit a rejection response from HPLMN 12, while the embodiment depicted in FIG. 6B utilizes N8 registration request message 55 to achieve this objective. Specifically, FIG. 6B depicts that AMF 24 sends N8 registration request message 55 to vSEPP 34. Next, vSEPP 34 embeds N8 registration request message 55 into N32 registration request message 62, digitally signs N32 registration request message 62 with its private key and sends the signed N32 registration request message 62 to hSEPP 36 via HTTP/2 Proxy 42 in IPX network 40.

After HTTP/2 Proxy 42 receives N32 registration request message 62, HTTP/2 Proxy 42 extracts the PLMN-ID of VPLMN 14. Upon determining that the PLMN-ID of VPLMN 14, from which N8 registration request message 55 originated, is a non-preferred roaming partner, HTTP/2 Proxy appends Patch-Request 58, instructing hSEPP 36 to replace MNC/MCC values in N8 registration request message 55 with a predefined value configured to trigger a rejection at UDM 30. Next, HTTP/2 Proxy 42 digitally signs Patch-Request 58 and appends it to N32 registration request message 62. When hSEPP 36 receives and validates N32 registration request message 62 and Patch-Request 58, hSEPP 36 changes the MNC/MCC value in the original N8 registration request message 55 to the predefined value specified in Patch-Request 58, thereby creating modified N8 registration request message 55'. Next, hSEPP 36 routes this modified N8 registration request message 55' to UDM 30, at which point, UDM 30 will reject the network attach request from VPLMN 12 based on the MNC/MCC value contained therein. In this manner, HTTP/2 Proxy 42 causes HPLMN 12 to reject registration requests originating from non-preferred roaming partners.

Figure 7:
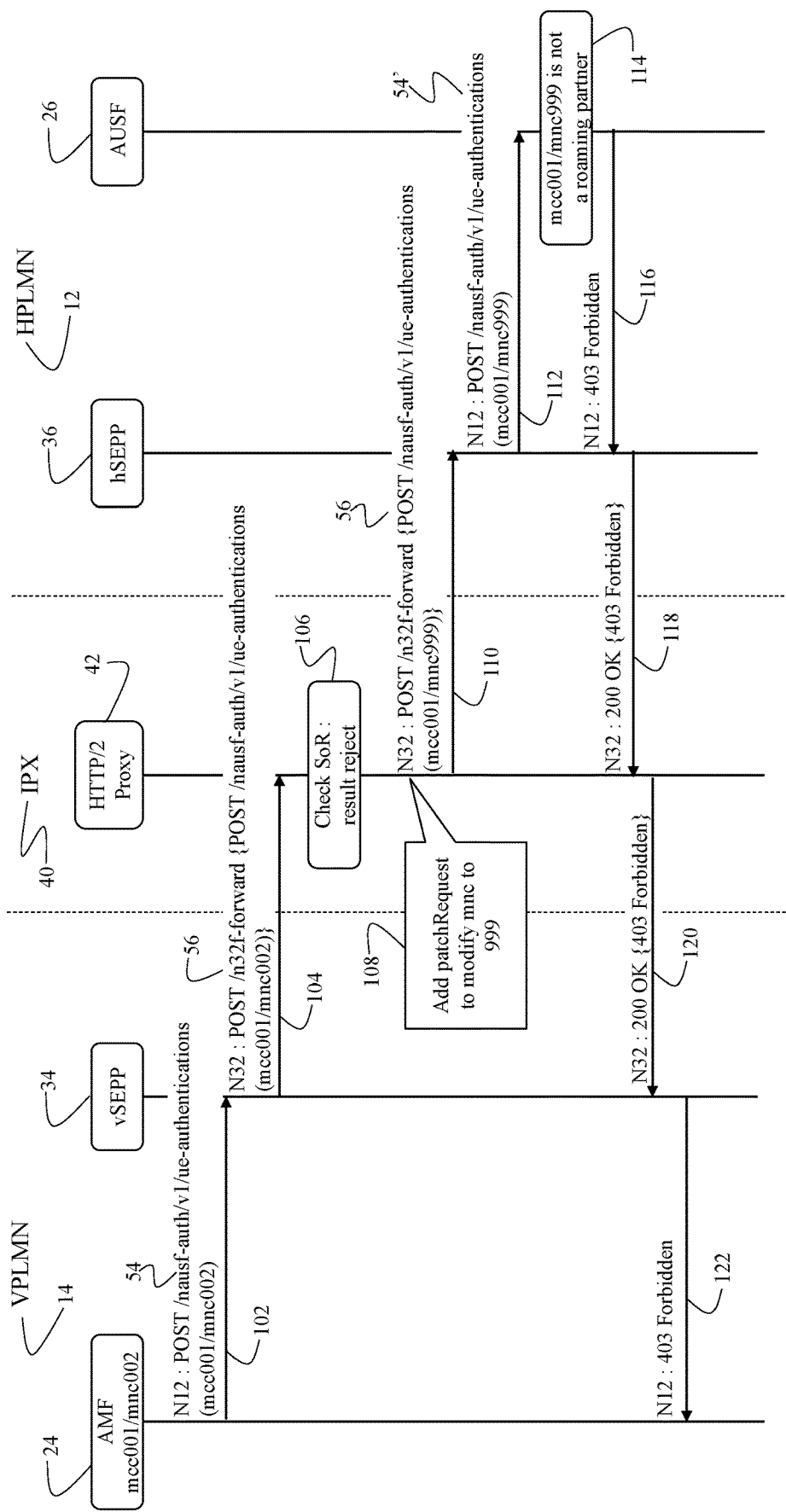
FIG. 7 is a sequential diagram schematically depicting the call flow when a N12 Nausf_UEAuthentication 'Authentication' request is rejected by the SoR Platform with HTTP/2 Proxy.
Figure 8:
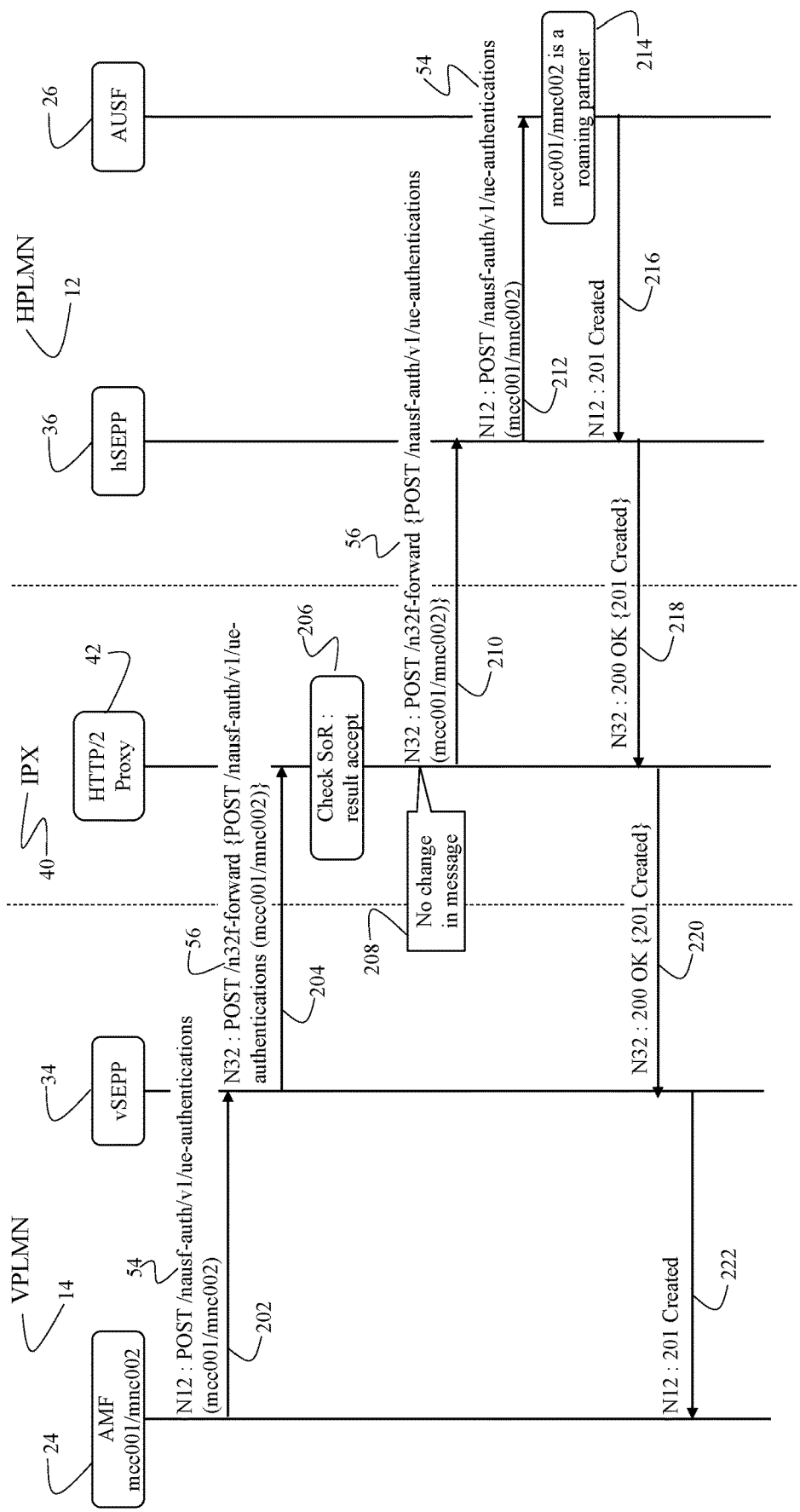
FIG. 8 is a sequential diagram schematically depicting the call flow when a N12 Nausf_UEAuthentication 'Authenticate' request is accepted by the SoR Platform with HTTP/2 Proxy.

In the embodiment depicted in FIGS. 7-8, the SoR is performed over the N12 interface 11. FIG. 7 is a signaling diagram depicting the signaling flow for aborting the network attach procedure at the authentication stage (Nausf service) when the authentication request is sent by VPLMN 14 that is non-preferred roaming partner of HPLMN 12.

First UE 10 selects a VPLMN 14 having network coverage area in the location in which UE 10 is currently roaming. In step 102, AMF 24 of VPLMN 14 selected by UE 10 sends N12 authentication request message 54 (Nausf_UEAuthenticate) to vSEPP 34 over N12 interface. In step 104, vSEPP 34 reformats the N12 authentication request message 54 into a JSON object embedded in a N32 authentication request message 56 ("request message") and sends the N32 authentication request message 56 to hSEPP 36 via HTTP/2 Proxy 42 in IPX network 40.

Upon receipt of N32 authentication request message 56, HTTP/2 Proxy 42 extracts the PLMN-ID (MCC/MNC) of VPLMN 14. In the example of FIG. 7, PLMN-ID consists of the MCC value '001' and the MNC value '002'. In step 106, HTTP/2 Proxy 42 queries Roaming Partner Database 46 to determine whether the extracted PLMN-ID is associated with a preferred roaming partner. Responsive to determining that the PLMN-ID corresponds to a non-roaming partner, HTTP/2 Proxy 42 determines that the network attach request from VPLMN 14 should be rejected and proceeds to step 108.

In step 108, HTTP/2 Proxy 42 appends a Patch-Request ("modifications-block") 58 to N32 authentication request message 56. Patch-Request 58 directs hSEPP 36 to modify the MCC and/or MNC value in the attachment request message to a predefined value that will trigger a rejection at HPLMN 12. In the example of FIG. 7, Patch-Request 58 directs hSEPP 36 to keep the MCC value unchanged, but to change the MNC value to '999', which is an undefined operator code for that country. HTTP/2 Proxy 42 digitally signs Patch-Request 58 using its private key and appends Patch-Request 58 to the N32 authentication request message 56. In step 110, HTTP/2 Proxy 42 routes N32 authentication request message 56 with the appended Patch-Request 58 to hSEPP 36.

Upon receipt of N32 authentication request message 56, hSEPP 36 validates authenticity of N32 authentication request message 56. Next, hSEPP 36 validates Patch-Request 58 by decrypting the digital signature using the public key of HTTP/2 Proxy 42. Upon successful validation of N32 authentication request message 56 and Patch-Request 58, hSEPP 36 reformats N32 authentication request message 56, extracts the original N12 authentication request message 54, and changes the value of MNC and/or MCC to the predefined value specified in Patch-Request 58. In step 112, hSEPP 36 routes the modified N12 authentication request message 54' to AUSF 26.

In step 114, AUSF 26 detects that the MNC/MCC value ('999') is not listed on the roaming partner list. In step 116, AUSF 26 sends a negative response (403 'Forbidden') to hSEPP 36 via N12 interface. Next, hSEPP 36 reformats the negative response into a N32 message and, in step 118, sends it to vSEPP 34 via HTTP/2 Proxy 42. In step 120, HTTP/2 Proxy 42 routes the N32 message to vSEPP 34. Next, vSEPP 34 extracts the N12 negative response and, in step 122, sends the N12 negative response message to AMF 24. Upon receipt of the negative 403 response, the authentication process is aborted.

Next, the UE will select another VPLMN 14 for network attachment. If the selected VPLMN 14 is also a non-preferred roaming partner, HTTP/2 Proxy 42 will again append a Patch-Request 58 directing hSEPP 36 to apply the same change to the MNC/MCC of the attach request, thereby triggering another rejection message from HPLMN 12. This process continues until UE 10 selects VPLMN 14 that is a preferred roaming partner (or after a threshold number of rejection cycles). At that point, the SoR method will accept the authentication request by executing the steps depicted in FIG. 8. In this manner, UE 10 is steered to attach to VPLMN 14 that is a preferred roaming partner of HPLMN 12.

FIG. 8 provides a signaling diagram depicting the signaling flow for accepting an authentication request from VPLMN 14—for example, when the authentication request is sent by a preferred partner VPLMN 14 or when a predefined number of authentication request rejections has been met (indicating that there may not be a preferred roaming partner available in the current location of UE 10). The process of UE 10 attaching to VPLMN 14 requires completion of a mutual-authentication procedure between UE 10 and AUSF 26 of HPLMN 12.

In step 202, AMF 24 of VPLMN 14 sends a N12 authentication request message (Nausf_UEAuthenticate) 54 to vSEPP 32. Embedded in the N12 request is the PLMN-ID of VLPMN 14, which comprises MCC and MNC values. Next, vSEPP 34 reformats the N12 authentication request message 54 into a JSON object embedded in a N32 authentication request message 56 ("request message"). In step 204, vSEPP 34 sends N32 authentication request message 56 to hSEPP 36 via a HTTP/2 Proxy 42 in IPX network 40. In step 206, HTTP/2 Proxy 42 implements SoR logic to determine whether the attach request from VPLMN 14 shall be accepted. In an embodiment, this determination is made by extracting PLMN-ID (MCC/MNC) and querying Roaming Partner Database 46 to determine whether the extracted PLMN-ID belongs to a preferred roaming partner. Responsive to determining that VPLMN 14 is indeed a preferred roaming partner, in step 208, HTTP/2 Proxy 42 does not make any changes to N32 authentication request message 56. In step 210, HTTP/2 Proxy 42 routes N32 authenticate request message 56 to hSEPP 36.

Upon receipt of N32 authenticate request message 56, hSEPP 36 reformats this message and extracts the original N12 authentication request message 54. In step 212, hSEPP 36 routes N12 authentication request message 54 to AUSF 26. In step 214, AUSF 26 confirms that the MCC and MNC values in the N12 authentication request message correspond to a valid roaming partner. In step 216, AUSF 26 sends a positive N12 response message (201 'Created') to hSEPP 36, which reformats it into a N32 response message. In step 218, hSEPP 36 sends the N32 response message to vSEPP 34 via HTTP/2 Proxy 42. In step 220, HTTP/2 Proxy 42 routes the N32 response message to vSEPP 34, which reformats it into the original N12 response message. In step 222, vSEPP 34 sends the positive N12 response message to AMF 24. The authentication process continues.

Figure 9:
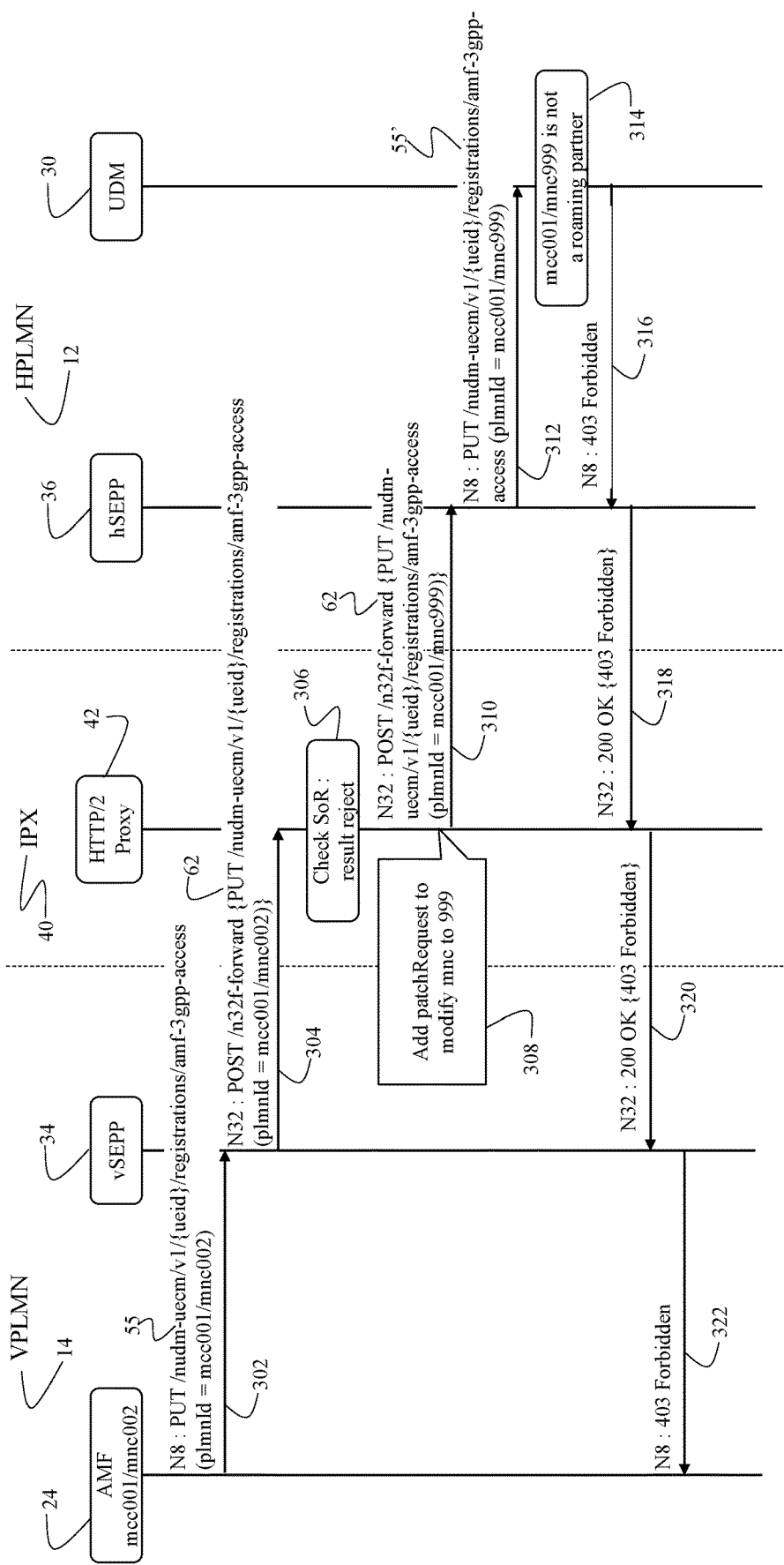
FIG. 9 is a sequential diagram schematically depicting the call flow when a N8 Nudm_UEContextManagement 'Registration' request is rejected by the SoR Platform with HTTP/2 Proxy.
Figure 10:
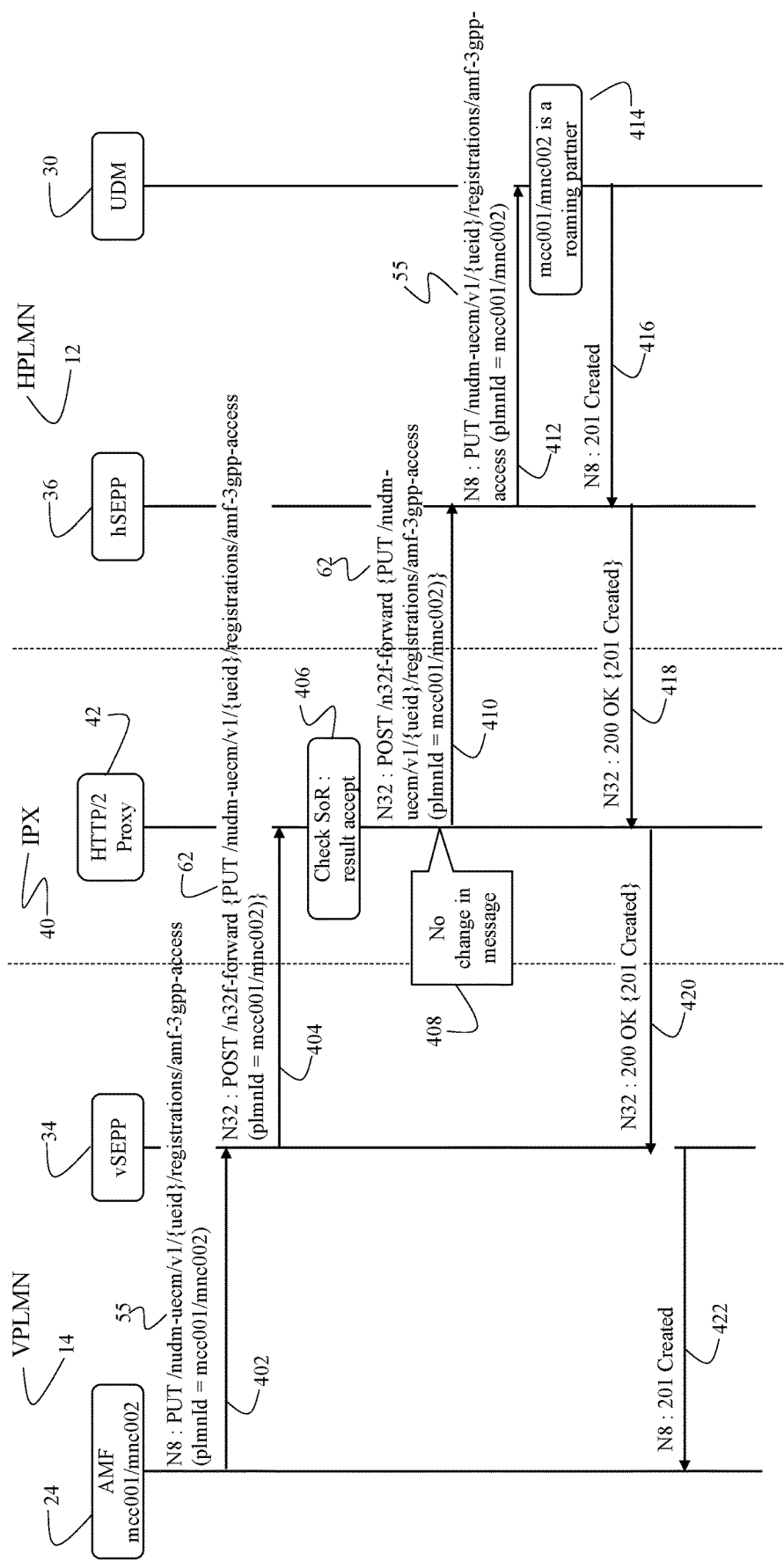
FIG. 10 is a sequential diagram schematically depicting the call flow when a N8 Nudm_UEContextManagement 'Registration' request is accepted by the SoR Platform with HTTP/2 Proxy.

In the embodiment depicted in FIGS. 9-10, the SoR is performed over the N8 interface. Specifically, FIG. 9 depicts a signaling flow for using the SoR platform to abort the network attach procedure at the registration stage (Nudm service). In step 302, AMF 24 sends a registration request message 55 (N8 Nudm_UEContextManagement) to vSEPP 34. Next, vSEPP 34 reformats and embeds N8 registration request message 55 into the body of a N32 registration request message 62 as a JSON object and digitally signs N32 registration request message 62 using its private key. In step 304, vSEPP 34 sends N32 registration request message 62 ("request message") to hSEPP 36 via HTTP/2 Proxy 42.

Upon receipt of N32 registration request message 62, HTTP/2 Proxy 42 extracts PLMN-ID (MCC/MNC) of VPLMN 14 and, in step 306, queries Roaming Partner Database 46 to determine whether the request is to be rejected (if the MCC/MNC belongs to a VPLMN 14 that is a non-preferred roaming partner) or accepted (if the MCC/MNC belong to a VPLMN that is a preferred roaming partner). If the request is to be rejected, in step 308, HTTP/2 Proxy 42 appends Patch-Request 58 to N32 registration request message 62, directing hSEPP 36 to modify the MCC/MNC code to a predefined value that is not a roaming partner of HPLMN 12. In the example depicted in FIG. 9, the MCC value is kept unchanged, while the MNC is modified to '999', which is an undefined operator code for that country. HTTP/2 Proxy 42 digitally signs Patch-Request 58 with its private key and, in step 310, HTTP/2 Proxy 42 routes N32 registration request message 62 and Patch-Request 58 appended thereto to hSEPP 36.

Upon receipt of N32 registration request message 62 with the appended Patch-Request 58, hSEPP 36 validates both N32 registration request message and Patch-Request 58 using public keys of vSEPP 34 and HTTP/2 Proxy 42 respectively. Upon successful validation, hSEPP 36 reformats N32 registration request message 62, extracts the original N8 registration request 55 and applies the change to the MCC/MNC value specified in Patch-Request 58. In step 312, hSEPP 36 routes the modified N8 registration request message 55' to UDM 30.

In step 314, UDM 30 determines that the MNC value ('999') does not belong to a VPLMN 14 listed on a roaming partner list and, therefore, sends a negative N8 response message (403 'Forbidden') in step 316. Next, hSEPP 36 formats the negative N8 response message into a N32 response message and sends it to vSEPP 34 via HTTP/2 Proxy 42. In step 320, HTTP/2 Proxy 42, routes the negative N32 response message to vSEPP 34. Next, vSEPP 34 reformats the negative N32 response message into the original N8 negative response message and sends it to AMF 322. As a result, the registration process is aborted.

Next, the UE will select another VPLMN 14 for network attachment. If the selected VPLMN 14 is also a non-preferred roaming partner, the SoR platform will apply the same change described above and the same process follows, until the device selects a VPLMN that is a preferred roaming partner, which the SoR platform will accept according to the signaling flow depicted in FIG. 10. In this manner, the SoR method steers UE 10 to attach to the preferred roaming partner.

FIG. 10 depicts the signaling flow for accepting an attach request from VPLMN 14. After the authentication procedure is completed, AMF 24 must register UE 10 in UDM 30. Steps 402 and 404 are the same as the steps 302 and 304 discussed with respect to FIG. 9. Specifically, in step 402 AMF 24 sends a N8 registration request message 55 (N8 Nudm_UEContextManagement) to vSEPP 34, which, reformats the N8 registration request message into a JSON object embedded in a N32-f registration request message 62 ("request message"). In step 404, vSEPP 34 sends N32 registration request message 62 to hSEPP 36 via a HTTP/2 Proxy 42 in IPX network 40. In step 406, HTTP/2 Proxy 42 implements its SoR logic to determine whether the request should be rejected—if the MCC/MNC in the attach request belongs to a VPLMN 14 that is not a preferred roaming partner—or accepted—if the MCC/MNC belongs to a VPLMN 14 that is a preferred roaming partner. When HTTP/2 Proxy 42 determines that VPLMN 14 is a preferred roaming partner, in step 408, HTTP/2 Proxy 42 does not make any message mediation and, in step 410, routes the N32 registration request 62 to hSEPP 36.

In step 414, hSEPP 36 reformats N32 registration request message 62 and extracts the original N8 registration request message 55. In step 412, hSEPP 36 routes N8 registration request message 55 to UDM 30. In step 414, UDM 30 determines that MNC/MCC values in N8 registration request message 55 correspond to a valid roaming partner and, in step 416, sends a positive response (201 'Created') to hSEPP 36 as a N8 response message. Next, hSEPP reformats the N8 response message to N32 response message and, in step 418, sends N32 response message to vSEPP 34 via HTTP/2 Proxy 42. In step 420, HTTP/2 Proxy 42 routes the N32 response message to vSEPP 34. Next, vSEPP 34 reformats the N32 response message into the original N8 response message and, in step 422, sends the N8 positive response message to AMF 24. The registration process continues.

In the manner described above, the present invention fully complies with the security design and requirements for N32 signaling communications between VPLMN 14 and HPLMN 12. Patch-Request (modifications-block) 58 is specified in 3GPP TS29.573 and can be implemented by HTTP/2 Proxy 42 in IPX network 40.

The present invention requires no change in VPLMN 14 nor HPLMN 12 network functions. Support of Patch-Request 58 can be implemented as a native feature in hSEPP 36, as specified in 3GPP TS29.573. No configuration or software changes in any of the related network elements such as AMF 24, AUSF 26 and UDM 30 is needed to support the SoR implementation disclosed above.

Network attachment requests (N12 or N8) rejected by UDM 30 due to SoR platform implementation are normal responses for 'roaming not allowed' and do not require any special handling on the visiting network functions nor mobile devices.

Information elements (IE) changes performed by IPX providers are governed by the 'selected protection policy information' during the N32-c parameter exchange procedure between the vSEPP 34 and hSEPP 36. Since the PLMN-ID needs to be modified by SoR, the policy shall be specified to make these IE 'modifiable' by IPX providers. Alternately, the hSEPP 36 may simply accept the changes made by IPX providers on these specific attributes.

Hardware and Software Infrastructure Examples

The various techniques described herein can be implemented in connection with hardware or software or, where appropriate, with a combination of both. Thus, the methods and system described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention can be a combination of hardware and software.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method for network-based Steering of Roaming (SoR) of a User Equipment (UE) subscribed to a Home Public Land Mobile Network (HPLMN) and roaming in a location where a plurality of Visited Public Land Mobile Networks (VPLMNs) have 5G network coverage, wherein the HPLMN is interconnected with the plurality of VPLMNs via an Internet Packet Exchange (IPX) network, the method comprising:

receiving, by a Proxy server provided in the IPX network, a first request message from a first VPLMN selected by the UE from the plurality of VPLMNs, wherein the first VPLMN is a non-preferred roaming partner of the HPLMN;

extracting, by the Proxy server, a first Public Land Mobile Network Identifier (PLMN ID) of the first VPLMN from the first request message;

querying, by the Proxy, a preferred roaming partner database for the first PLMN ID to determine whether the first PLMN ID is present in the preferred roaming partner database;

responsive to determining that the first PLMN ID is absent from the preferred roaming partner database, generating, by the Proxy server, a patch-request configured to cause a home Security Edge Protection Proxy (hSEPP) of the HPLMN to replace a Mobility Country Code (MCC) value or a Mobility Network Code (MNC) value in the first request message with a predefined value, wherein the predefined value is configured to cause the HPLMN to reject the first request message;

routing, by the Proxy server, the first request message and the patch-request to the hSEPP, whereby, upon validation of the patch-request, the hSEPP is configured to replace the MCC or the MNC value in the first request message with the predefined value specified in the patch-request, thereby causing the HPLMN to respond with a rejection message;

receiving, by the Proxy server, the rejection message from the HPLMN;

routing, by the Proxy server, the rejection message to the first VPLMN, thereby causing the first VPLMN to abort network attachment;

receiving, by the Proxy server, a second request message from a second VPLMN selected by the UE from the plurality of the VPLMNs, wherein the second VPLMN is a preferred roaming partner of the HPLMN;

extracting, by the Proxy server, a second PLMN ID of the second VPLMN from the second request message;

querying, by the Proxy server, the preferred roaming partner database for the second PLMN ID to determine whether the second PLMN ID is present in the preferred roaming partner database;

responsive to determining that the second PLMN ID is present in the preferred roaming partner database, routing the second request message to the HPLMN, whereby the HPLMN is configured to respond with a positive response message;

receiving, by the Proxy server, the positive response message from the HPLMN; and routing, by the Proxy server, the positive response message to the second VPLMN, thereby causing the second VPLMN to proceed with network attachment.

2. The method of claim 1, wherein the Proxy server is configured to digitally sign the patch-request using a private key.

3. The method of claim 2, wherein the hSEPP validates the patch-request using a public key of the Proxy server.

4. The method of claim 1, wherein the first request message is an authentication request message.

5. The method of claim 1, wherein the patch-request is configured to cause the hSEPP to modify a Serving Network Name in an 'AuthenticationInfo' information element of a N12 'Nausf_UEAuthentication' authentication request message.

6. The method of claim 1, wherein the first request message is a registration request message.

7. The method of claim 1, wherein the patch-request is configured to cause the hSEPP to modify the PLMN-ID in Globally Unique AMF Identifier (guami) in an 'Amf3GppAccessRegistration' information element of a N8 Nudm_UEContextManagement registration request message.

8. The method of claim 1, wherein the first request message is routed to and from the Proxy server via a N32-f interface.

9. The method of claim 8, wherein the first request message comprises an embedded N8 registration request message or an embedded N12 authentication request message.

10. The method of claim 1, wherein the Proxy server is a Hypertext Transfer Protocol (HTTP)/2 Proxy.

11. A method for network-based Steering of Roaming (SoR) of a User Equipment (UE) subscribed to a Home Public Land Mobile Network (HPLMN) and roaming in a location where a plurality of Visited Public Land Mobile Networks (VPLMNs) have 5G network coverage, wherein the HPLMN is interconnected with the plurality of VPLMNs via an Internet Packet Exchange (IPX) network, the method comprising:

receiving, by a Proxy server provided in the IPX network, a first N32-f message from a first VPLMN selected by the UE from the plurality of VPLMNs, wherein the first N32-f message has an embedded N12 authentication request message or an embedded N8 registration request message, wherein the first VPLMN is a non-preferred roaming partner of the HPLMN;

extracting, by the Proxy server, a first Public Land Mobile Network Identifier (PLMN ID) of the first VPLMN from the first N32-f message;

querying, by the Proxy, a preferred roaming partner database for the first PLMN ID to determine whether the first PLMN ID is present in the preferred roaming partner database;

responsive to determining that the first PLMN ID is absent from the preferred roaming partner database, generating, by the Proxy server, a patch-request configured to cause a home Security Edge Protection Proxy (hSEPP) of the HPLMN to replace a Mobility Country Code (MCC) value or a Mobility Network Code (MNC) value in the embedded N12 authentication request message or the embedded N8 registration request message with a predefined value, wherein the predefined value is configured to cause the HPLMN to respond with a rejection message;

routing, by the Proxy server, the first N32-f message and the patch-request to the hSEPP, whereby, upon validation of the patch-request, the hSEPP is configured to replace the MCC or the MNC value in the embedded N12 authentication request message or the embedded N8 registration request message with the predefined value specified in the patch-request, thereby causing the HPLMN to respond with a rejection message;

receiving, by the Proxy server, the rejection message from the HPLMN;

routing, by the Proxy server, the rejection message to the first VPLMN, thereby causing the first VPLMN to abort network attachment;

receiving, by the Proxy server, a second N32-f message from a second VPLMN selected by the UE from the plurality of the VPLMNs, wherein the second VPLMN is a preferred roaming partner of the HPLMN;

extracting, by the Proxy server, a second PLMN ID of the second VPLMN from the second N32-f message;

querying, by the Proxy server, the preferred roaming partner database for the second PLMN ID to determine whether the second PLMN ID is present in the preferred roaming partner database;

responsive to determining that the second PLMN ID is present in the preferred roaming partner database, routing the second N32-f message to the HPLMN, whereby the HPLMN responds with a positive response message;

receiving, by the Proxy server, the positive response message from the HPLMN; and routing, by the Proxy server, the positive response message to the second VPLMN, thereby causing the second VPLMN to proceed with network attachment.

12. The method of claim 11, wherein the hSEPP is configured to extract the embedded N12 authentication request message or the embedded N8 registration request message from the first N32-f message.

13. The method of claim 12, wherein, the hSEPP is configured to route an extracted N12 authentication request message to an Authentication Server Function (AUSF) of the HPLMN or to route an extracted N8 registration request message to a Unified Data Management (UDM) of the HPLMN.

14. The method of claim 12, wherein the patch-request is configured to cause the hSEPP to modify a Serving Network Name in an 'AuthenticationInfo' information element of an extracted N12 authentication request message.

15. The method of claim 12, wherein the patch-request is configured to cause the hSEPP to modify the PLMN-ID in Globally Unique AMF Identifier (guami) in an 'Amf3GppAccessRegistration' information element of an extracted N8 registration request message.

16. The method of claim 11, wherein a visiting Security Edge Protection Proxy (vSEPP) of the first VPLMN is configured to reformat a N12 authentication request message or a N8 registration request message into the first N32-f message.

17. The method of claim 11, wherein the embedded N12 authentication request message or the embedded N8 authentication request message is a JavaScript Object Notation (JSON) object.

18. The method of claim 11, wherein the first request message is routed to and from the Proxy server via a N32-f interface.

19. The method of claim 11, wherein the Proxy server is a Hypertext Transfer Protocol (HTTP)/2 Proxy.

20. The method of claim 11, wherein the Proxy server is configured to digitally sign the patch-request using a private key.

* * * * *